United States Patent [19]

Collins et al.

[11] 4,438,495
[45] Mar. 20, 1984

[54] TOMOGRAPHY WINDOW-LEVEL GAMMA FUNCTIONS

[75] Inventors: Arthur K. Collins, Waukesha; Edward W. Andrews, Brookfield; Nallaswamy Srinivasan, Waukesha, all of Wis.

[73] Assignee: General Electric Company, Schenectady, N.Y.

[21] Appl. No.: 321,008

[22] Filed: Nov. 13, 1981

[51] Int. Cl.³ .................. G06F 15/42; H04N 5/14
[52] U.S. Cl. .................... 364/414; 358/111; 358/166; 364/571; 378/901; 382/6; 382/54
[58] Field of Search .............. 364/414, 571, 415, 900; 378/901, 18, 20; 358/111, 183, 160, 166; 382/6, 54, 57

[56] References Cited

U.S. PATENT DOCUMENTS

| | | | |
|---|---|---|---|
| 4,105,922 | 8/1978 | Lambert et al. | 364/414 |
| 4,217,641 | 8/1980 | Naparstek | 382/6 |
| 4,323,977 | 4/1982 | Arseneau | 364/571 |
| 4,394,688 | 7/1983 | Iida et al. | 382/54 |

*Primary Examiner*—Errol A. Krass

*Attorney, Agent, or Firm*—Fuller, House & Hohenfeldt

[57] ABSTRACT

Apparatus for applying a gamma correction to digital CT numbers at a selected level and within a window. A memory is loaded sequentially with the gamma correction lookup table. At the start a counter generates a sequence of addresses, in response to clock pulses. These are addresses to another memory. Simultaneously, a variable address generator addresses the gamma lookup table memory to effect transfer of the gamma correction data to the other memory (window-gamma lookup table) at locations that are represented by the ratio of the locations in the gamma lookup table to the address in the window-gamma table. To read out and produce an image, the window black value is subtracted from the stored CT numbers in sequence. The resulting differences constitute addresses to the window-gamma lookup table whose output is then the gamma corrected values for CT numbers in the window. This digitized data is converted to analog video signals for driving a television monitor that displays the image.

4 Claims, 5 Drawing Figures

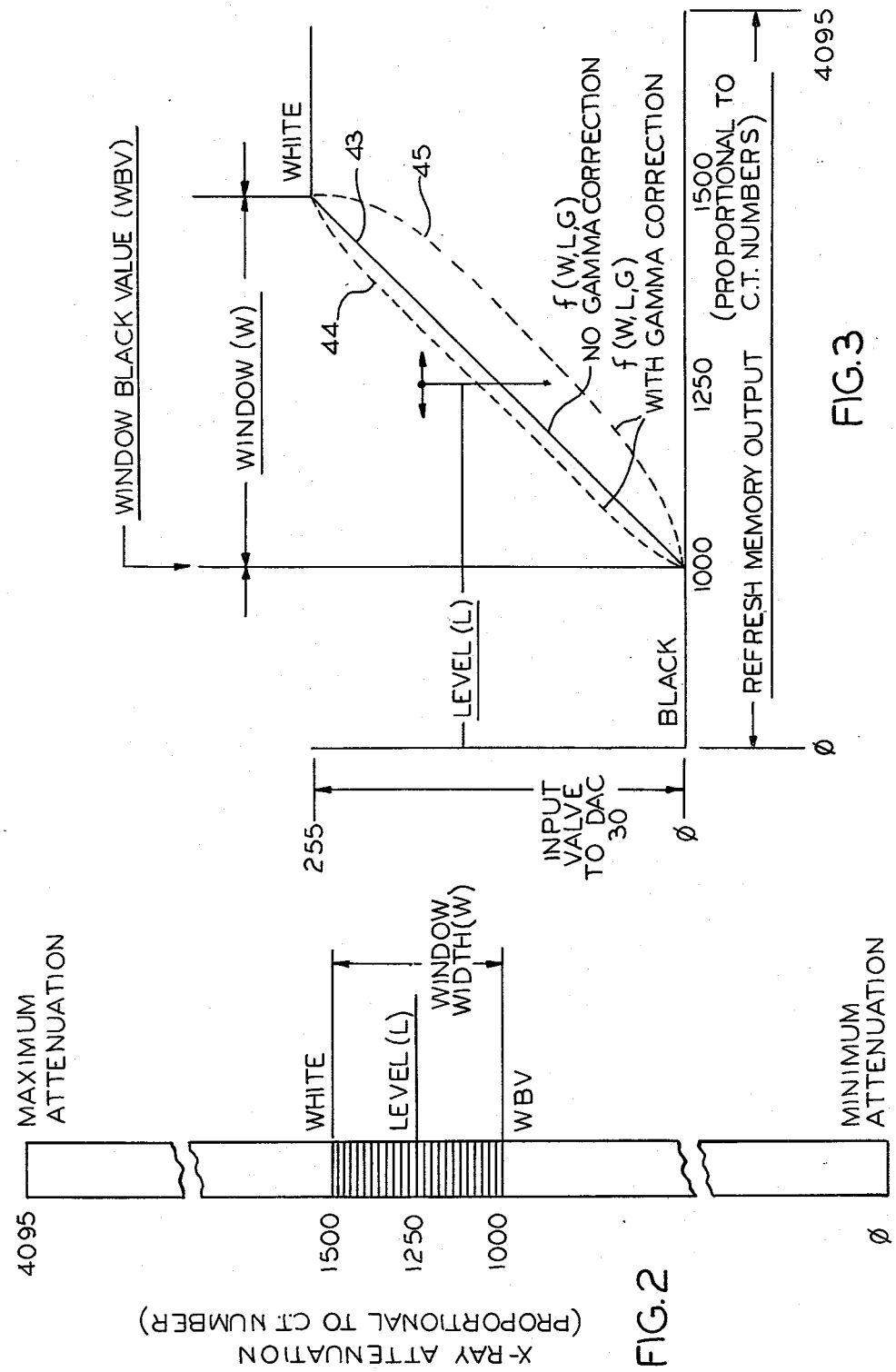

TOMOGRAPHY WINDOW-LEVEL GAMMA FUNCTIONS

BACKGROUND OF THE INVENTION

This invention relates to computed x-ray tomography and is particularly concerned with providing gamma correction to the digital pixel values that compose an x-ray image.

In computed tomography, the image pixels are represented by CT numbers. CT numbers are proportional to the x-ray attenuation by small volume elements in the body being scanned with an x-ray beam. In a sense, CT numbers represent the brightness of the pixels which compose an image. Although CT numbers correspond to x-ray intensities or brightness, any output device by which the image is displayed whether it be film, a television monitor and even the eye itself is non-linear. By way of example, a pixel value or CT number of 50 may not appear on the television screen as being twice as bright as an input CT number of 25. Thus, the CT number or digital pixel data is usually modified by a correction factor which is commonly called gamma correction. Gamma corrections differ for direct viewing of an image on a TV screen and for filming an image from a TV screen. In the latter case, for example, the non-linear responses of the television monitor and film must be taken into account.

The multicell detectors that are used for sensing x-ray attenuation by the body in computed tomography apparatus and for providing intensity signals to a computer are extremely sensitive to small differences in x-ray intensity. Using data provided by the detector cells, the computer algorithm operates to produce a range of CT numbers with greater x-ray intensity resolution or gray scale steps than can be distinguished by the human eye. For example, present tomographic image reconstruction methods are capable of quantitizing x-ray intensity measurements into 4096 separate intensity levels. Human viewers, on the other hand, are typically incapable of discerning more than approximately 64 visually discernable shades or gray scale levels. Hence, it has been the practice to select from a large range of CT values a limited range called a window and to display pixels having CT values within the window over the gray scale capability of the television tube in which case CT numbers above the upper window limit are white and those below the lower window limit are black.

It has been customary in computed tomography systems to provide the user with controls for selecting window level (L) and window width (W) and for selecting the gamma correction table that is appropriate for the manner in which the image is displayed or viewed. Note that window is defined as the window white value minus the black value (WBV). The number of CT numbers within the window is the window width plus one. The window width and level functions are used to expand or compress the gray scale around a given CT number. With a wider window, more CT numbers are displayed. Narrower windows display fewer CT numbers. By way of example, narrow windows are used to investigate tissue such as in the brain where small variations in density must be discerned to distinguish healthy from unhealthy tissue. Wide windows may be used to investigate bony structures where there are wide variations of density.

Heretofore, two different methods were used for making the appropriate gamma correction in relation to the level and window which had been selected. One method uses a dedicated microprocessor to supply the window value and level value to one window-level look-up table and gamma data to another gamma correction look-up table. Each table had a particular transfer function. The array of digital pixel values or CT numbers representing the image were held in a full-frame image refresh memory. Before a video image could be provided, the window-level look-up table and the gamma look-up table had to be loaded. Typically, this took about 200 ms. However, it is customary for the user to adjust the window level while viewing the image on the television tube. During adjustment, a scrambled or blanked image appeared on the screen. This was distracting to the observer.

In the other prior art method, a microprocessor is used to load a window-level look-up table and the data therein is multiplied by a suitable factor to provide gamma correction. This process may be somewhat faster but it still has the disadvantage of scrambling or blanking the image on the display tube during window and level adjustments.

SUMMARY OF THE INVENTION

In accordance with the invention, the window and gamma correction look-up tables are concatenated. In other words, the window adjustment functions and gamma correction functions are achieved with one look-up table that is loaded with window and gamma transfer functions. Level is adjusted by way of a subtractor. Moreover, loading is caused to occur during the vertical blanking interval of the television monitor in which case no scrambling of the image due to level adjustment is perceptible on the viewing screen.

Briefly stated, in accordance with the invention, the pixel data, in terms of digital CT numbers, representative of an x-ray image is held in a full frame refresh memory. A random access memory is loaded sequentially with at least one look-up table for making one of the aforementioned types of gamma correction. This table is called a gamma lookup table. Another random access memory, called a window-gamma lookup table, is also used. It is loaded during the vertical blanking interval of the television monitor that is used to display the x-ray image. The window and level and the appropriate gamma correction for the chosen window and level are related by means of the window-gamma lookup table.

When a vertical blanking pulse occurs, clocking of an address producing means at a high rate begins. In the illustrated embodiment, this means is implemented with a counter. The counter output is a series of addresses to the window-gamma lookup table. Simultaneously with the start of the production of addresses by the counter, a variable rate address generator or index generator is activated. It addresses the gamma lookup table and causes it to output a gamma correction value to the location or locations in the window-gamma lookup table that are currently being addressed by the counter.

In an actual embodiment the gamma value range is zero to 255 serial addresses in the gamma look-up table which is 8-bits deep. The window-gamma lookup table has 1024 serial addresses. The index value to the gamma lookup equal to $255 \div$ (window width). Thus, for any address in the gamma look-up table, the gamma correction value at that address goes to an address in the window-gamma lookup table that is determined by taking the ratio of the address in the gamma lookup table currently being accessed to the total number of addresses in the gamma lookup table and effectively multiplying this ratio by the window width. After the window-gamma lookup table becomes fully loaded during the blanking interval, a switch is made to the image readout and display mode.

For image display, a subtractor subtracts the window black level value, that is, the lower window limit from the consecutive CT number values that are stored in the refresh memory. The difference values resulting from the successive subtractions are addresses to the window-gamma lookup table which outputs successive digital pixel values that are gamma corrected for the selected window width. The latter values are converted to analog video signals that drive a television monitor that displays the image.

DESCRIPTION OF THE DRAWINGS

FIG. 2 shows a typical CT number x-ray intensity scale from minimum to maximum, with respect to which an illustrative window level and window width has been selected for being gamma corrected in accordance with the invention;

FIG. 3 is a graph that is useful for identifying the terminology and for describing the results obtained with the new gamma correction system.

DESCRIPTION OF A PREFERRED EMBODIMENT

Figure 1A:
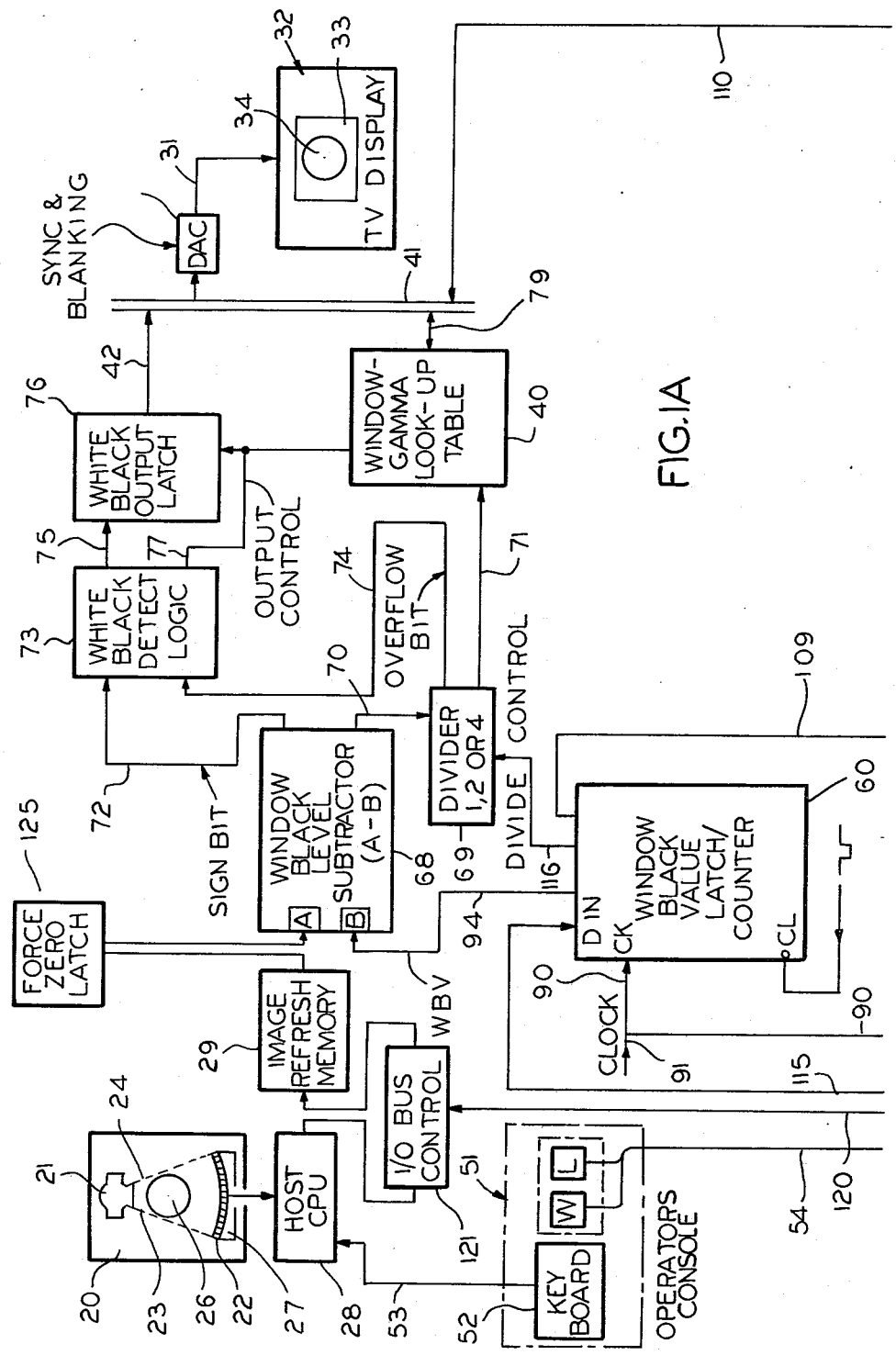
FIG. 1, composed of parts 1A and 1B, shows a diagram of a computed tomography system in conjunction with a block diagram of the new system wherein the window level and gamma transfer functions are concatenated in a single lookup table.
Figure 1B:
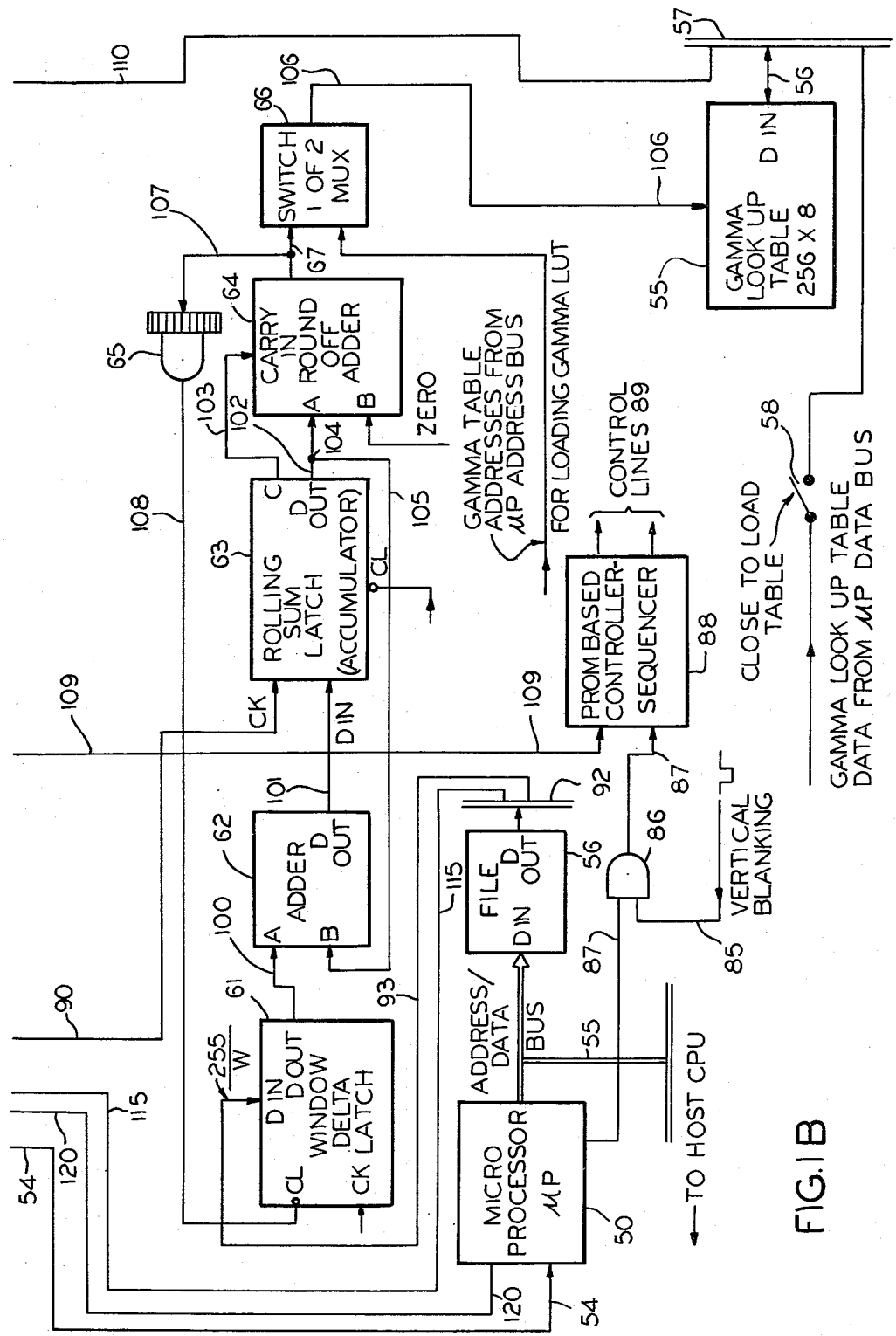

Attention is invited to FIG. 1 for an overview of computer tomography apparatus in which the new system for selecting window and level and making a gamma correction will be used. FIG. 1 is comprised of two parts, FIGS. 1A and 1B. In the upper left region of FIG. 1A, the elements of a computed tomography scanner are shown within a block marked 20. The scanner includes an x-ray tube 21 for projecting a thin fan-shaped x-ray beam toward a multiple cell x-ray detector 22. The boundaries of the beam are identified by the numerals 23 and 24. A body 26 is located in the x-ray beam path. In the x-ray scanning process, the x-ray source 21 and multiple-cell detector 25 are rotated jointly around the body. The individual cells of detector 25 produce analog signals representative of the x-ray intensities of the scanned body layer along ray bundles that emerge from the body and compose the x-ray beam. The analog signals produced by the detector cells are read out by a data acquisition system 27 at successive angles of rotation of the detector. Data acquisition system 27 digitizes the x-ray intensity data and transmits it to a computer that is represented by the block marked 28 and labelled host CPU. CPU 28 executes an algorithm which results in digital pixel values being produced that are representative of an x-ray image, in axial perspective, of the body layer that was scanned. The pixel values are expressed as CT numbers that correspond to x-ray intensity or brightness of the zones in the image which they represent. CT numbers are defined as follows:

$$CT \text{ number} = K\left[\frac{u_t - u_w}{u_w}\right]$$

where $u_w$ is the x-ray absorption coefficient of water, $u_t$ is the x-ray absorption coefficient of tissue, and K is a constant that depends on the number of gray scale gradations into which the full intensity range is divided.

These CT values for an image frame are transmitted from the host CPU to a full-frame image refresh memory represented by the block marked 29. For the present it is sufficient to say that the digital pixel or CT values are ultimately converted to analog video signals with a digital-to-analog converter that appears in the right region of FIG. 1A and is represented by a block marked 30 and labelled DAC. The analog output signals from the DAC are fed by way of a cable 31 to a television monitor 32 on whose screen 33 the optical version of an x-ray image 34 of a cross-section of the body is displayed.

Description of FIG. 1 will be continued later. Attention is now invited to FIG. 2. FIG. 2 shows, in the embodiment under consideration, the range of CT numbers to extend from 0 to 4095, or, in other words, the CT numbers are represented by 12-bit digital numbers. Since the human eye cannot distinguish brightness levels of such small gradation, the 12-bit values are ultimately converted to 8-bit values or 0 to 255 quantization levels. As shown in FIG. 2, low CT numbers result from high x-ray intensities and correspond to blackness in the x-ray image. The lower window limit is called the window black value (WBV) herein. High CT numbers result from low x-ray intensities and correspond to increasing whiteness in the image. These are called white bone images. In reality, however, the digital data representing an image can be inverted so that bone will appear black in the displayed image and in such cases they are called black bone images.

Some times the radiologist desires to study tissue which is known roughly to be at a certain density level such that it would be desirable if pixels or CT numbers of corresponding intensity or brightness were displayed and blacker and whiter pixels were excluded from viewing. An illustrative CT number range is denominated window width (W) in FIG. 2. In this particular example, the window width is 500 since the range of intensities or CT numbers extends from 1000 to 1500. The center of the window is called the level (L). In FIG. 2 the chosen level corresponds to a CT number of 1250. The level and window width are operator selectable. The window can be compressed to provide fewer shades of gray in the displayed image and can be expanded to provide up to 256 shades of gray.

An important feature of the invention is to load a single lookup table (LUT) with data that permits correcting the CT numbers for gamma for any chosen window level and width. The lookup table of interest is designated as window-gamma LUT and is represented by the block marked 40 in FIG. 1. In this illustrative embodiment, LUT 40 is a 1024 word by 8-bit random access memory. In accordance with the invention, this table is loaded during the television monitor blanking interval with data for effectuating a particular transfer function during television display.

The pixel data or CT numbers from the image refresh memory 29 have the window black value subtracted from them and the differences become addresses to the data in look-up table 40 for image readout, in a manner that will be explained in detail later. The digital video output signals from window-gamma LUT 40 are sent to a digital video bus 41 for being input to previously mentioned DAC 30 where they are converted to analog video signals that control the TV display 32.

The process of achieving gamma correction for any selected window width and level is shown graphically in FIG. 3. Here the refresh memory 29 output or x-ray intensities are represented by the abscissa in the range from 0 to 4095. The input to DAC 30 is represented by the ordinate which has an 8-bit digital range or a range of 0 to 255. FIG. 3 is a plot wherein the solid slope line 43 represents a linear function of window width, level and gamma, f(W,L,G) with no gamma correction. The two dashed lines 44 and 45 are typical functions, f(W,L,G) with gamma correction. Using the numerical example of FIG. 2, it will be seen in FIG. 3 that the window black value (WBV) is 1000. All CT numbers below the WBV will be driven to black in the television display. On the other hand, x-ray intensities above the upper window limit which is 1500 in this example, will be driven white in the display. The window black value (WBV), window width, (W), and level (L) for an illustrative case are all designated in FIG. 3.

The process of loading window-gamma LUT 40 during the TV vertical blanking interval will now be described in reference to FIG. 1. Most of the components involved with the loading process are shown in part 1B of FIG. 1. In FIG. 1B, a microprocessor 50 is used to control the system. Operator interaction is obtained with an operator's terminal or console that is represented symbolically by the dashed-line rectangle 51. The console has a keyboard 52 which the user operates to inform the host CPU as to the particular gamma correction table that is desired. Different gamma correction tables are usually used for direct television viewing and for recording an image on film from the television screen, for example. The keyboard is shown coupled to the host CPU 28 by means of a bus 53. The operator's console also contains control devices marked W and L which the operator uses to select window width and level, respectively. These control devices are for providing the window and level information to microprocessor 50 by means of a bus 54.

The microprocessor has an address/data bus 55 associated with it. Among other things, bus 55 feeds into a file which is marked with that legend and with the reference numeral 56. The file is used for storing information whose purpose will be discussed later. Bus 55 is also the path of communication between host CPU 28 and microprocessor 50. The same bus goes to other components in the system which will be discussed soon.

Assume that the operator has used the operator's console 51 to select a gamma correction appropriate for some particular display mode such as display on a TV screen that is going to be viewed directly with the eyes. Assume further that the operator has chosen a window width and level by using console 51 and that appropriate inputs to microprocessor 50 have been made by way of bus 54. As will be more evident later, in accordance with the invention, window and level can be adjusted while an image based on whatever data is in image refresh memory 29 is being displayed on the TV screen 33 without the user seeing any blips or other artifacts on the screen during adjustment.

In FIG. 1, after the desired gamma correction is selected, a gamma LUT 55, in the right region of FIG. 1B, is loaded serially with gamma values. LUT 55 can be a relatively slow and, hence, inexpensive random-access memory (RAM). In this embodiment, gamma LUT 55 is a RAM capable of storing 256 8-bit words. Several read-only memories (ROMs) could be used instead of a RAM in which case the respective ROMs could each store a gamma lookup table of a different type and any one could be selected or enabled when needed. Indirectly, as will be seen, the transfer function of this gamma lookup table corresponds to having an 8-bit window corrected CT number input and having an 8-bit output constituting the input value corrected for gamma for the particular window width chosen. The gamma LUT 55 is loaded and read out through the agency of a bidirectional 8-bit bus 56 which coupled to another bus 57. Bus 57 couples to the address/data bus leading back to the host CPU. There is an eight parallel path electronic switch symbolized by the switch marked 58 in this bus circuit. When switch 58 is closed, data for loading the gamma LUT 55 is supplied from the host CPU. In a commercial embodiment, the memory or LUT 55 is large enough to accommodate four distinct 256 word gamma lookup tables of different transfer functions, but the invention can be explained adequately if it is assumed that only one gamma lookup table is used at a time.

Two operations must occur before there can be output of gamma-corrected video pixel data to the television monitor 32. First, the window-gamma LUT 40 must be loaded with data generated by a window-gamma table index generator, that is, by a variable rate address generator. Second, a window black value counter/latch 60 must be reset to a value of zero. The variable rate address generator generates addresses at a rate that depends on the selected window width. This address generator is comprised of a window delta latch 61, an adder 62, a rolling sum latch or accumulator 63, a roundoff adder 64 and an AND gate 65. Output of the index or variable rate address generator is through a switching device in the form of a 1-of-2 multiplexer (MUX) 66. This MUX has an input line 67 from roundoff adder 64. It also has an input for gamma table 55 addresses that are supplied from the microprocessor address as labelled on the drawing when the gamma LUT 55 is being loaded. Output from the roundoff adder is an 8-bit number. Besides the variable rate address generator just described, other components involved in loading the window-gamma LUT include the previously designated window black value latch/counter 60, a window black level subtractor 68, a force zero latch 125 that can force the A input of the subtractor 68 equal to zero during loading of window-gamma lookup table 40, and a divider 69 which is actually a shifter. The output of subtractor 68 is a 13-bit bus 70 which is an input to divider 69. A 10-bit bus 71 couples the output of divider 69 to the address input of window-gamma LUT 40.

Another output line 72 from window black level subtractor 68 provides a sign bit associated with 2's complement subtraction. If, for example, the sign bit is high, then the output is negative and, if it is low, the output from the subtractor 68 is positive. The sign bit is provided to a white-black detect logic circuit represented by the block labelled with the legend and marked 73. Divider 69 has an output 74 that provides an overflow bit input to white-black detect logic circuit 73. This circuit has an output 75 which is input to a white-black output latch 76. There is also an output control line 77 running from white-black detect logic circuit to white-black output bus latch 76 and window-gamma lookup table 40. Latch 76 has an output 42 coupling it to digital video bus 41. The window-gamma LUT 40 also couples to digital video bus 41 by way of a bidirectional bus 79. The window-gamma LUT 40 is loaded with data from gamma LUT 55 through bidirectional bus 79 during the loading process within the blanking interval and this bus also provides a path from window-gamma LUT 40 for gamma corrected video pixel data that will be fed by way of video bus 41 and DAC 30 to the television monitor 32 for providing an image on a screen that is composed of pixel values, related to CT numbers, contained between the black and white values or lower and upper window limits.

Assume now that the user has selected a gamma correction table by using keyboard 52 of the operator console and that the gamma LUT 55 is loaded with the related 256 by 8-bit word gamma correction transfer function. Assume that some stable image is appearing on the screen 33 of television monitor 32. Now the user decides to adjust the window or level or both by operating switches W or L in the operator console 51. Concurrently with making these window adjustments, microprocessor 50 calculates the window black level (WBV) value and stores it in file 56 for later use in connection with image display. When a television vertical blanking pulse occurs following window width adjustment it is input by way of a line 85 to a negative logic AND gate 86 which has another input 87 from microprocessor 50. Input 87 to gate 86 is switched to logical one by the microprocessor just before a television vertical blanking pulse occurs. The vertical blanking pulse enables AND gate 86 which provides a logical one, by way of line 87, to a controller-sequencer 88. Controller-sequencer 88 has a plurality of control lines 89 which run to various components of the system. Controller-sequencer 88 consists of a programmable read-only memory (PROM) and a latch. Controller-sequencer 88 initializes the system for loading the window-gamma LUT 40 from gamma LUT 55 in response to receiving the vertical blanking pulse signal. In accordance with the invention, the window-gamma LUT 40 is loaded before read-out of the next image frame is scheduled to occur and before expiration of the vertical blanking interval so the user will observe no artifacts on the television monitor screen regardless of any window width or level change. In a commercial embodiment, loading is accomplished in 1 ms as compared with at least 200 ms which were required when, in accordance with prior practice, window-level output values were stored in one LUT and the gamma correction table was stored in another lookup table or memory. The window-gamma LUT 40 loading process requires that data from the gamma lookup table 55 be addressed to the window-gamma LUT 40. The manner in which these addresses are produced will be discussed first and then involvement of the index generator or variable rate address generator (composed of items 61, 62, 63, 64 and 65) will be discussed.

When a vertical blanking pulse occurs, the window black value latch/counter 60 is cleared with a pulse applied to its clear input (CL). The window black value latch/counter 60 is used in its counting mode during loading of the window-gamma LUT 40. Counter 60 has a clock input 90 supplied by way of a line 91 that leads to a clock pulse generator, not shown. By way of example and not limitation, the load clock rate is 450 nanoseconds which is desirable for a 60 Hz television display system. A different clock rate would be used for a 50 Hz television system.

It may be noted at this time, that before the window-gamma LUT 40 loading process begins, the window delta latch 61 of the variable rate address generator, which latch is essentially a register, is loaded with a 20-bit delta value represented by an 8-bit integer and a 12-bit fraction. This number corresponds to $255 \div$ (window width), called the window delta or window increment value. Addresses in the gamma LUT 55 run from zero to 255. Prior to the time the vertical blanking pulse occurs, microprocessor 50 performs this division and provides the value through file 56 and a bus segment 92 and a 16-bit bus 93 to the data input pins of window delta latch 61. The window delta latch 61 has a clock input pin marked CK. This latch is used indirectly for generating addresses or pointers to gamma LUT locations for a purpose that will be evident later.

Assume that the system is initialized for the window-gamma LUT 40 loading process following occurrence of a vertical blanking pulse. The count function of the address producing means, namely, of the window black value latch/counter 60 is enabled. The counter will increment every time a load clock occurs. The counter output value will correspond to the address of the window-gamma LUT 40 being loaded from gamma LUT 55. These are serial addresses. The addresses are output from window black value latch counter 60 by way of a 14-bit bus 94 to the B input of subtractor 68 which is set at this time to simply pass the counts or address values to its output line 70. The A side of the window black level subtractor is forced to equal zero so the B side input address values are passed to the output 70 unmodified. In other words, the divider 69 at this time simply divides by 1 and outputs the address by way of a 10-bit bus 71 to the address input pins of window-gamma LUT 40. As previously stated, lookup table 40 is a 1024 × 8-bit memory. The addresses are to locations where data from the gamma LUT 55 will be sent in response to operation of the variable rate address generator which is functioning concurrently with the address generation process just described in connection with the window black value latch/counter 60. As will be seen, the number of addresses in the window-gamma LUT 40 that are loaded with gamma correction values corresponds to the window width. Addresses above this number will be loaded with values that result in white display on the television screen when in the white bone image mode.

The variable rate address generator will now be discussed in more detail. The 20-bit number with 8-bits of integer and 12 bits of fraction that is loaded into the window delta latch 61 represents a value that is going to be added to itself to generate addresses or pointers into gamma LUT 55. For a window width of 500 as in the FIG. 2 example, this number would equal $255 \div (500)$ or 0.510. For larger window widths, this number would, of course, be a smaller fraction and for window widths under 255 it would have an integer and a fractional part. As a further example, if the window width were 6 CT numbers, $255 \div (6)$ would be 42.5.

Thus, in any selected window there is a certain range of CT numbers from the bottom of the window to its top. All CT numbers below the window black value or WBV are mapped black, corresponding to all zeroes to DAC 30. All values equal to the upper window limit and higher are mapped white. The window width must be expressed in terms of an 8-bit number of 256 gamma values that are available. Dividing 255 by the window width yields a number (delta) which when added to itself N times equals the current gamma table address (where N is equal to the number of clocks and to the number stored in the window black value latch/counter 60). In the numerical example, where the window width is 500 and window delta is 0.510, and say 10 clocks have been applied to the window black value latch/counter 60, the window-gamma LUT 40 address would be 10 and the gamma LUT 55 address would be equal to 10 times delta or 10×0.510=5.10. When expressed in 20-bit binary form, the delta value in this case is equivalent to 00000000.100000101000, this being expressed as an 8-bit integer and a 12-bit decimal totalling 20-bits as previously mentioned.

Assume that the user adjusts the control in the operator console to select a new window width either at the existing window level or some other level. The microprocessor will immediately calculate 255÷(W) and load the resulting 20-bit integer and fractional value resulting from division in file 56. The next thing to happen is for the line 87 from the microprocessor 50 to AND gate 86 to go active. When the next vertical blanking pulse occurs it is fed to input 85 of AND gate 86 to enable it and its output changes state. This causes the controller-sequencer 88 to start the sequence for loading window-gamma LUT 40 during the blanking interval. The rolling sum adder or accumulator 63 is cleared. The WBV latch/counter 60 is also cleared and has its counting mode enabled to produce addresses for the window-gamma LUT 40 as previously described. Concurrently, the calculated 255÷(W) index value is put in the window delta latch 61. The rolling sum latch will be clocked at the same rate as window black value counter/latch 60 to produce its first and subsequent outputs of said calculated value in synchronism with clocking of WBV latch/counter 60.

The window delta latch 61 output value resulting from the 255÷(W) operation is coupled by way of a 20-bit wide bus to the A input of adder 62 when a clocking begins. The output of adder 62 is coupled by way of a 20-bit wide bus 101 to the input pins of rolling sum latch or accumulator 63. The output from the rolling sum latch 63 is coupled by way of an 8-bit wide bus 102 to the A input of roundoff adder 64. The B input to roundoff adder 64 is set to zero since the adder's function is to round off. There is also a 1-bit wide carry bit line 103 running from rolling sum latch 63 to roundoff adder 64. Line 103 carries the most significant bit of the fraction present at the output of the rolling sum latch 63. A 20-bit wide bus 105 forms a feedback loop from a junction 104 in rolling sum latch output bus 102 to the B input of ADDER 62. The portion of bus 102 between junction 104 and the A input of roundoff adder 64 is only 8 bits wide. This portion transmits the whole or integer part of data output of rolling sum latch 63 to the A input of roundoff adder 64.

Assume now that the calculated window delta value is in window delta latch or register 61. When the first and ensuing clock pulses occur during the window-gamma LUT load cycle there is an input of the delta value to adder 62 and a corresponding output on output bus 102 of the rolling sum latch 63. This output is fed back to the B input of adder 62. Now for the first and succeeding clock pulses the output from the rolling sum latch is repeatedly added to the delta value by adder 62 and the results of the additions are input to roundoff adder 64. Every time the fractional value of the sum of an addition out of the rolling sum latch 63 is equal to 0.5 decimal or greater, that is, whenever the most significant bit of the fractional part of the 20-bit value is a 1 the roundoff adder 64 rounds off to the next highest integer value. The resulting outputs on 8-bit bus 67 from the roundoff adder 64 become addresses to the gamma LUT 55. These addresses are fed through MUX 66 and 8-bit address bus to the address inputs of gamma lookup table 55. Every time the gamma LUT 55 is addressed, the gamma correction value at that address is sent to the window-gamma LUT 40 by way of buses 110, 41 and 79. The gamma value sent goes to an address (N) in LUT 40 represented by the equation:

$$N = \left[ \frac{\text{current rolling sum value}}{255} \right] \times \text{window width} \quad \text{(Eq. 1)}$$

This will be discussed in greater detail later when an example of window gamma LUT 40 loading is given using illustrative concrete numbers. The equation means that the variable rate address generator produces addresses at a rate that is inversely proportional to the window width.

The 8-bit output bus 67 from the roundoff adder 64 has an 8-bit bus 107 connected to it. The lines of bus 107 connect respectively to the eight inputs of AND gate 65. Thus, when the output from roundoff adder reaches 255 the output of gate 65 goes active and this high signal is transmitted by way of a line 108 to the clear (CL) pin or window delta latch 61 to set its output to zero and stop the indexing process. Of course, when the output of the roundoff adder 64 reaches 255 this coincides with the gamma data in the highest numbered address in the gamma LUT 55 being transferred to its assigned location in the window-gamma LUT 40. The address-producing window black value latch/counter 60 will continue to count and produce addresses up to 1023 to the window gamma LUT 40. When the counter 60 has counted and produced addresses up to 1024, it sends a signal by way of a line 109 to the sequence controller 88 to inform the controller that loading is complete and it responds by setting up the components in the system for output of the video data for causing the next image frame 34 to appear on the television monitor 32 after termination of the vertical blanking interval. The number of addresses in the window-gamma LUT 40 that are loaded with a gamma correction transfer function from the gamma LUT 55 will be equal to the window width value as indicated earlier. Addresses above the window width value are loaded with values that will produce all white on the display screen.

It should be realized that the gamma LUT 55 was loaded sequentially at the outset with digital values for modifying CT number values in accordance with the amount of gamma correction required for successive CT numbers within a window. The index or variable rate address generator described in the preceding paragraphs provides addresses which correspond to stepping through the window width in steps basically equal to 255÷(W). So an 8-bit address will encompass a series of CT numbers in a window. In general, any address in the gamma LUT 55 that is addressed will yield the corresponding gamma corrected value that is sent to a specific location or locations in the window gamma LUT 40.

An example, using concrete number values, is desirable for elucidating the manner in which the window black value counter 60, operating in its counting and address producing mode, and the index pointer generator, that is, the variable rate address generator cooperate to load window gamma LUT 40.

Figure 4:
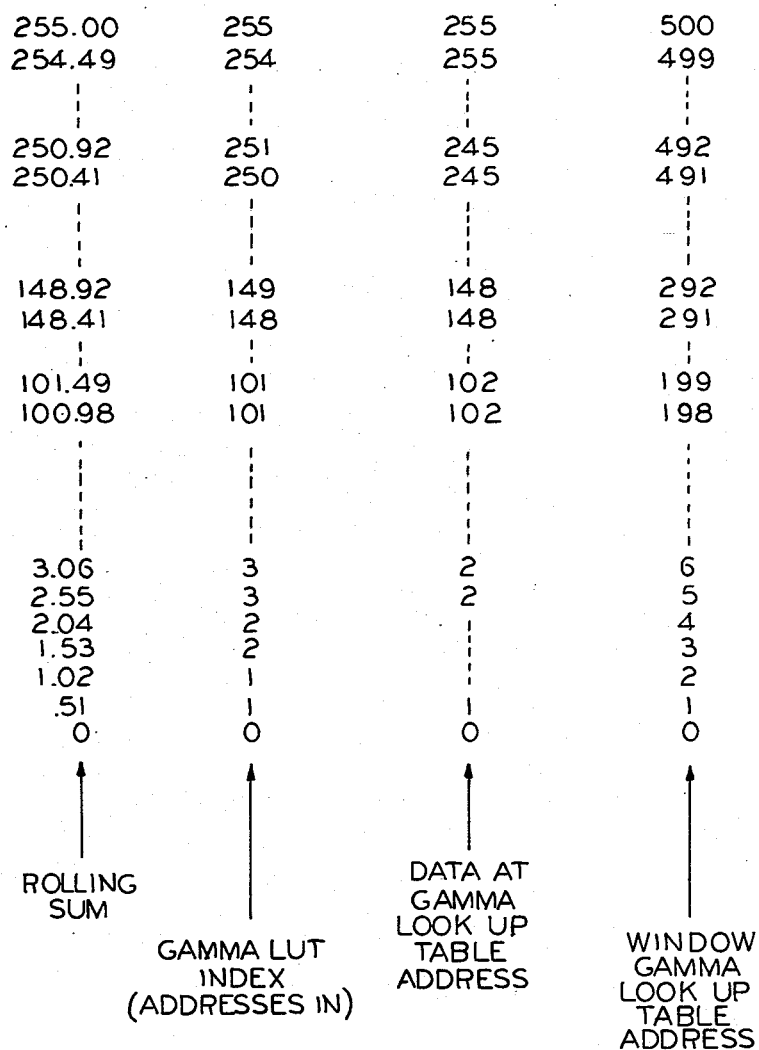
FIG. 4 is a table for examplifying how, in a typical case, the gamma lookup data is properly related to the CT number data in the window to which the gamma correction is to be made.

Using the FIG. 2 example and also referring to FIG. 4, assume a window level at CT number 1250 and a window width of 500 is selected by the user. Any CT number below the window black value (WBV) of 1000 will be black and any above the upper window limit of 1500 will be white in a white bone gamma case. Following a vertical blanking pulse, the window black value counter 60 will be clocked to produce a sequence of 0 to 1023 addressable 8-bit locations in this embodiment.

Since the window width is 500 the delta index value will be 0.510 decimal or binary 00000000.10000101000 as an 8-bit integer and 12-bit fraction digital number. Hence, 0.510 decimal is the index number which will be subject to rolling addition until a sum of 254 plus the fraction is produced. The rolling sum latch 63 output is set forth in the list designated Rolling Sum in FIG. 4 which contains some illustrative values of rolling sums.

The roundoff adder 64 rounds off the consecutive rolling sums to the next highest integer each whenever the fractional or decimal part of a sum is equal to or greater than 0.5 decimal. The rounded off values are in the list designated Gamma LUT Index and Addresses In to the gamma LUT 64. Note that, in general, for an index value of 0.510 every location in the gamma LUT 55 is addressed twice in succession which means that the same gamma corrected value at the address will go into two adjacent locations in the window gamma LUT 40. If, for another example, the index value had been 0.12, cumulative or rolling addition and rounding off would have yielded rolling sums of 0.12, 0.24, 0.36, 0.48, and next 0.60, 0.72, 0.84, 0.96 and so forth. The corresponding respective rounded off addresses would be 0, 0, 0, 0 and 1, 1, 1, 1 and so on since values after 0.60, which is greater than one-half, would be rounded off to 1.

As shown in FIG. 4, at each address in gamma LUT 55 there is gamma corrected value appropriate to a CT number in the window in the non-linear table which has been stored in gamma LUT 55. For instance, when the rolling sum got up to 100.98 and 101.49 the corresponding rounded off address was 101 twice. The gamma corrected data at address 252 of LUT 55 may be arbitrarily 245 for example. This data would be written into address 492 of the window-gamma LUT 40. For, in accordance with equation 1, N, the address is calculated by $$\left[ \frac{\text{current rolling sum (100.98)}}{256} \right] \times \text{window width (500)} = 198 = N.$$

This will be clearer if the reader recalls that for every load clock pulse, the window black value (WBV) counter 60 increases its output address value by 1. It runs from zero to 1023 addresses. When the first clock pulse occurs the WBV counter 60 produces address number 1 and the location is addressed in the window-gamma LUT 40. Finally location 1023 is addressed in the window-gamma LUT 40. As previously indicated, the index or variable rate address generator is clocked in synchronism with counter 60. For each clock pulse the index generator produces an increased rolling sum and address. Thus, one may take the ratio of any rounded off gamma LUT address as compared to the ratio of the total number of addresses in the window-gamma LUT for the full window (which is 500 in the present example) to get the address in the window-gamma LUT at which any data at the selected gamma LUT address is located.

When the rolling sum reaches 255, the contents of the last address of the gamma LUT 55 will be loaded into the 500th address of the window-gamma LUT 40 in this example. Also at this time gate 65 goes active and clears the window delta latch 61 by way of line 108. This causes the value stored in rolling sum latch 63 to remain constant throughout the remainder of the window gamma LUT 40 loading cycle. The remainder of the locations in LUT 40 up to 1023 will be loaded with the value in the 255th location of the gamma LUT 55 which means that for a white bone case, these locations will contain an 8-bit value of all 1's.

It should be realized that the rate at which addresses to the gamma LUT 55 are incremented by the variable rate address generator depends on window width. Also recall, with a location in the gamma LUT 55 being addressed and with the transfer of gamma correction value from the gamma LUT 55 to the window-gamma LUT 40, the window black value latch/counter 60 is producing a coincident address to the window-gamma LUT to which the value from the gamma LUT 55 is assigned. If, by way of example, window width, W, were 6, 255÷(W) would be 42.5. In that case, the rolling sum would reach 255 after 6 additions and production of 7 addresses to the gamma LUT 55. The addresses would be 0, 43, 85, 128, 170, 213 and 255 and the gamma values for these addresses would be transferred to the window-gamma LUT. The window black value latch/counter 60 would have produced 7 addresses in synchronism so the 7 data words would have been assigned to addresses 0, 1, 2, 3, 4, 5 and 6 in the window-gamma LUT. Address 6 and remaining addresses up through 1023 would be filled with all eight 1's for white fill in the white bone case.

Consider the previous example where the window width is 500 so the index value was 255÷(500) or 0.510. In this case, as demonstrated in connection with FIG. 4, the data in address number 1 of the gamma LUT 55 would be sent to addresses 1 and 2 of the window-gamma LUT, data at address 2 of the gamma LUT 55 would be sent to address 3 and 4 of the window-gamma LUT and so on. This clarifies the meaning of the ratio between the addresses for the two look-up tables in reference to equation 1. In the latter case, of course, after the first 500 of the addresses in the window-gamma LUT are filled with data corresponding to the gamma values the remainder of the 1023 locations are white filled.

The window-gamma lookup table 40 has now been loaded during a vertical blanking interval without any disturbance on the television screen 33. Presentation of the next and subsequent images on television screen can now be discussed. The 512×512 matrix of 12-bit CT numbers or digital pixel values comprising an image frame are stored in the display controller image refresh memory 29. The frame data has been loaded into the refresh memory as a result of the microprocessor 50 providing a control signal by way of line 120 to the I/O bus control 121 which is in the bus between the CPU 28 and refresh memory 29.

Referring to FIG. 1, for image display, immediately after the window-gamma LUT 40 is loaded, the window black value is loaded from file 56, by way of bus 115 into the window black value latch/counter which is now in its latch mode. In the FIG. 2 example, the window black value (WBV) has a CT number value of 1000 in the decimal system. The digital equivalent of the WBV is supplied from latch 60, by way of bus 94, to the B input of the window black level subtractor 68. The CT numbers, whose digitally expressed magnitudes correspond to pixel brightness or intensity, are clocked out of the refresh memory 29 sequentially at video rates. The clock rate depends on whether the television monitor 32 is synchronized to 50 Hz or 60 Hz power line frequency, for example.

Every time a CT number for a pixel is input to the A input of window black level subtractor 68, the subtractor outputs a value on bus 70 representative of the difference between the CT number and the window black value. These difference values become addresses to the window gamma LUT 40. As will be explained later, only difference values or addresses that are within the window-gamma lookup table address range or 0 to 1023 cause the window-gamma LUT 40 to output gamma corrected pixel intensity values by way of bus 79. CT numbers below the WBV or lower window limit will be converted to black and those above the upper window limit will be white.

The difference value addresses that are output from subtractor 68 pass through shifter divider 69. If the user selected window width is equal to or less than 1023, the window-gamma LUT 40 will have 1024 addresses or less filled with gamma correction values in which case the divider is set to divide by 1. If the window width is between 1024 and 2047, the divider is set to divide by 2. And if the width is between 2048 and 4095 CT values, the divider is set to divide by 4. The divider is set to divide by 1, 2 or 4 with a control bus 116 out of the counter 60 whose 2 most significant bits go to 00 or 01 or 10 to cause the divider to divide by 1, 2 or 4, respectively. It is because the number of addresses in the window-gamma LUT 40 is from 0 to 1023 that division is necessary when window widths are greater than 1024. It would be difficult to load 4096 gamma values during a blanking interval. This permits using a lower capacity and, hence, much less expensive fast access memory for window-gamma LUT 40.

The window-black level subtractor 68 actually puts out difference value addresses indicative of how much a pixel CT number is above the bottom of the window. The gamma corrected values in the loaded window-gamma LUT have been put in at addresses corresponding to where they are located in the window due to the ratio established by indexing and executing of Equation 1. As implied earlier, the window-gamma LUT 40 is only active to perform a CT value to gamma corrected value transfer function for those CT numbers from the frame refresh memory 29 that are within the window-gamma LUT address range. The addresses to the window-gamma LUT 40 are 10-bits wide. The gamma corrected digital video output from LUT 40 to video bus 41 are 8-bits.

CT numbers below the window black level are mapped to zero or black. For instance, in the numerical example set forth earlier, where the lower window limit corresponded to an x-ray intensity of 1000, intensities below 1000 must be all zeroes or black in a white bone correction scheme. The window width was 500 and the upper limit corresponded to an x-ray intensity of 1500. Thus, intensities above the upper limit have an intensity value of 255 out of LUT 40 and are mapped white. This is illustrated graphically in FIG. 3.

Black mapping results from the fact that when the window black value is subtracted by subtractor 68 from a CT number that is below the window black value a negative number results. The sign bit on line 72 out of the subtractor 68 goes high or to logic 1. The white-black detect logic module 73 responds by providing a signal to window-gamma LUT 40, by way of output control bus 77, that disables the output of LUT 40 to prevent it from driving the video output bus 41. At the same time the white-black output latch 76 is enabled to cause it to output a fixed value such as 8 bits of zero on the video bus which corresponds to black.

If the CT number is above the upper window limit such as a value of 1750 in the example where the upper limit was 1500, the result of subtracting the window black value of 1000 would be 750. In a divide-by-1 situation the output of divider 79 would be 750. At any address beyond the window width of 500 in the given example, all addresses have been loaded with 8 bits of 1's or a value of 255 which represents white. Thus, intensities above the upper window limit or those corresponding to a window-gamma LUT 40 address of 500 through 1023 cause output of 8 bits of 1 from window-gamma LUT 40 which drive the video monitor white.

Consider the situation when the result of subtraction is greater than 1023 and beyond the address range of the window-gamma LUT 40. For example, assume a large CT number of 3500 in the exemplifying case where the window black value was 1000. The address result produced by the subtractor would be 3500−1000=2500 which is beyond the LUT 40 range when the divider is set to divide by 1. This address of 2500 would result in a logic 1 overflow bit being produced by divider 69 and inserted to white-black detect logic module 73. The overflow signal will then cause module 73 to output a signal on output control bus 77 to disable the LUT 40 output and enable the white-black latch 76 output for the latter to put 8 bits of all 1's on the video bus which corresponds to all white being displayed for such high value CT numbers.

The example given above and FIG. 3 apply to what is called white-bone gamma correction where the highest CT number corresponds to low x-ray image intensity as where bone is the x-rays are heavily absorbed. Thus, the higher the CT number the higher is the 8-bit gamma corrected value to the DAC and the brighter is the pixel on the display screen. This resulted from loading a gamma correction table in gamma LUT 55 where the data at address zero corresponded to the least intense or bright pixel and the data at address 256 corresponded to the highest or brightest intensity. This situation is represented by the positive slope of the correction curves in FIG. 3.

For black bone gamma correction the slope would be opposite from that in FIG. 3 such that the highest CT values would be represented on the television display screen up the gray scale toward white and lower CT values tending toward zero would be tending toward black. In other words, the gamma LUT 55 is loaded in reverse sequence from the sequence for white bone correction. That is, for black bone, address zero in LUT has the gamma value for white and address 255 has the value for black.

In accordance with prior practice, the gamma LUT was loaded with one or the other of black bone or white bone gamma correction values. Black bone values would produce a positive image on the television screen. If a negative image was desired the analog video signals feeding the television display monitor had to be inverted and this required expensive extra circuit components. With the present invention, both white bone and black bone gamma correction values can be loaded into 256×8-bit portions of gamma LUT 55 memory. Then one may switch from one memory block to the other to go from white bone to black bone display. In the present system this can be done with a few inexpensive gates, not shown. This switching process can be accomplished by the microprocessor 50 reading address 0 out of the active gamma LUT 55 memory. The microprocessor then determines whether the contents of address 0 are all zeroes or all ones. When the contents are all ones, microprocessor 50 sends a signal which inverts the operation of the white-black output latch 76. Thus, when the WBV subtractor 68 output is negative, white-black output latch outputs 1's. When the subtractor 68 output is 1024 or greater, then the white-black latch 76 outputs 8 zeroes.

Although an embodiment of the invention has been described in detail, the true scope of the invention is to be determined only by interpreting the claims which follow.

We claim:

1. Computed tomography apparatus comprising refresh memory means for storing an array of digital CT numbers having values in a predetermined range wherein the values correspond to the intensities of the pixels that compose an x-ray image, means for converting digital values related to the CT number values to corresponding analog video signals, television means responsive to said video signals by displaying an optical version of said x-ray image, means for selecting the level and width of a window which width is defined between an upper limit CT number and a lower limit CT number that is designated as the window black value, and means for converting said CT number values within the window to gamma corrected values before they are converted to video signals, said last-named means including:

gamma lookup table storing memory means whose addresses contain a lookup table of digital gamma corrected data values for the respective CT numbers within said range, said gamma lookup table memory means having address input means and a data output port, a window-gamma lookup table memory means having a port for data input coupled to the output port of said gamma lookup table memory means and having address input means, address producing means responsive to occurrence of a vertical blanking pulse for said television means by producing a sequence of addresses to said window-gamma lookup table memory means, variable rate address generator means operative concurrently with said address producing means to provide a sequence of addresses to said gamma lookup table memory means, said last-named addresses being provided at such rate that the last gamma lookup table address is addressed at the same time that the last window-gamma lookup table address corresponding to said upper window limit is addressed, said gamma lookup table memory means responding to an address by output of gamma correction data at the address to the address in said window-gamma lookup table memory means that is currently being addressed by said address producing means, and subtractor means operative after termination of a vertical blanking interval to subtract said window black value from successive CT number values that are stored in said refresh memory, the CT number difference values resulting from subtraction of CT number values within the window constituting addresses to said memory storing said window-gamma lookup table, said memory responding to successive addresses by output of the gamma corrected digital values corresponding to the CT number difference values at video rate to said means for converting said digital values to analog video signals to which said television means responds by displaying the image.

2. The apparatus defined in claim 1 including:

means for output of a fixed digital pixel intensity value, detection means responsive to the result of any subtraction by said subtractor means being negative by disabling output from said window-gamma lookup table memory means and enabling said means for output of a fixed value to output said fixed value to said means for converting digital values to analog video signals, said detection means also responding to occurrence of an overflow resulting from the value being subtracted being greater than the last address in said window-gamma lookup table by disabling output from said window-gamma lookup table memory means and enabling said means for output of a fixed value to output said fixed value to said means for converting digital values to analog video signals.

3. The apparatus as in any of claims 1 or 2 wherein said variable rate address generator comprises:

latch means for storing a digital value equal to the number of gamma lookup table memory addresses that are loaded with a gamma correction value divided by the window width, the result of said division being a binary number comprised of an integer and a fractional part, said latch means having an output and responding to clock pulses by repeated output of said binary number, a rolling sum accumulator having an input and an output and having a carry line for the most significant bit of any fraction present on its output, an adder having one input coupled to said latch output for receiving said binary number and another input coupled to said output of the accumulator, said adder being operative to repeatedly add said binary number to the output from accumulator and store the result in said accumulator upon occurrence of each clock pulse, a roundoff adder having an input coupled to said accumulator output and an output for supplying said addresses in integer form to said gamma lookup table memory means, said roundoff adder responding to the most significant bit of any fraction corresponding to a decimal number value equal to or greater than 0.5 by output of the next highest integer, and means responding to the rolling sum reaching a value corresponding to the last address in said gamma lookup table memory means by clearing said latch to thereby cause said value stored in said rolling sum accumulator to remain constant during the remainder of the window-gamma lookup table loading operation.

4. The apparatus as in claim 1 wherein:
said subtractor means has an input for addresses produced by said address producing means and another input for CT number values stored in said image refresh memory means, said subtractor means being controlled to couple said produced addresses to its output means during window-gamma lookup table memory means loading from said gamma lookup table means and being controlled to perform said subtraction of the window black value from the CT number values and provide said difference values on its output means as said addresses to said window-gamma lookup table means during image display.

* * * * *